United States Patent [19]

Levine

[11] Patent Number: 4,790,256

[45] Date of Patent: Dec. 13, 1988

[54] TWO-PIECE COMBINATION BOAT AND LUGGAGE CARRIER

[76] Inventor: Howard E. Levine, 4401 E. Hearn Rd., Phoenix, Ariz. 85032

[21] Appl. No.: 831,313

[22] Filed: Feb. 20, 1986

Related U.S. Application Data

[63] Continuation-in-part of Ser. No. 788,684, Oct. 16, 1985, abandoned, which is a continuation-in-part of Ser. No. 660,717, Oct. 15, 1984, abandoned.

[51] Int. Cl.$^4$ .............................................. B63B 7/04
[52] U.S. Cl. .................................... 114/352; 224/309; 224/328
[58] Field of Search ............... 114/352, 353, 363, 361, 114/77 R; 224/309, 327, 328; 292/258, 288

[56] References Cited

U.S. PATENT DOCUMENTS

| | | | |
|---|---|---|---|
| 2,157,186 | 5/1939 | Pinter, Sr. et al. | 114/353 X |
| 2,328,693 | 9/1943 | Taylor | 114/352 X |
| 2,584,685 | 2/1952 | Evert | 114/352 |

FOREIGN PATENT DOCUMENTS

| | | | |
|---|---|---|---|
| 1416986 | 12/1975 | United Kingdom | 114/352 |
| 2131866 | 6/1984 | United Kingdom | 292/288 |

Primary Examiner—Sherman D. Basinger
Attorney, Agent, or Firm—Thomas E. Spath

[57] ABSTRACT

A combination two-section boat and cargo carrier comprises first and second substantially identical sections. Each section has a substantially horizontal bottom surface, at least two generally vertical sidewalls, and a generally vertical connecting wall. The connecting wall is configured with a male connector which protrudes from the surface of the connecting wall in a direction generally normal to the plane of the connecting wall, and a complementary female connector which is recessed into the connecting wall in a direction generally normal to the plane of the connecting wall. The male and female connectors are symmetrically disposed from a vertical center line of the connecting wall, and adapted to mate with each other when the connecting walls of the first and second identical sections are placed in abutting relation to one another. A removable assembly blade connector is provided in order to join the male and female connectors, so as to form a boat. When superposed, the sections provide a water-tight cargo carrier that is secured by removable clamps that engage the upper protruding edges of the sections.

20 Claims, 5 Drawing Sheets

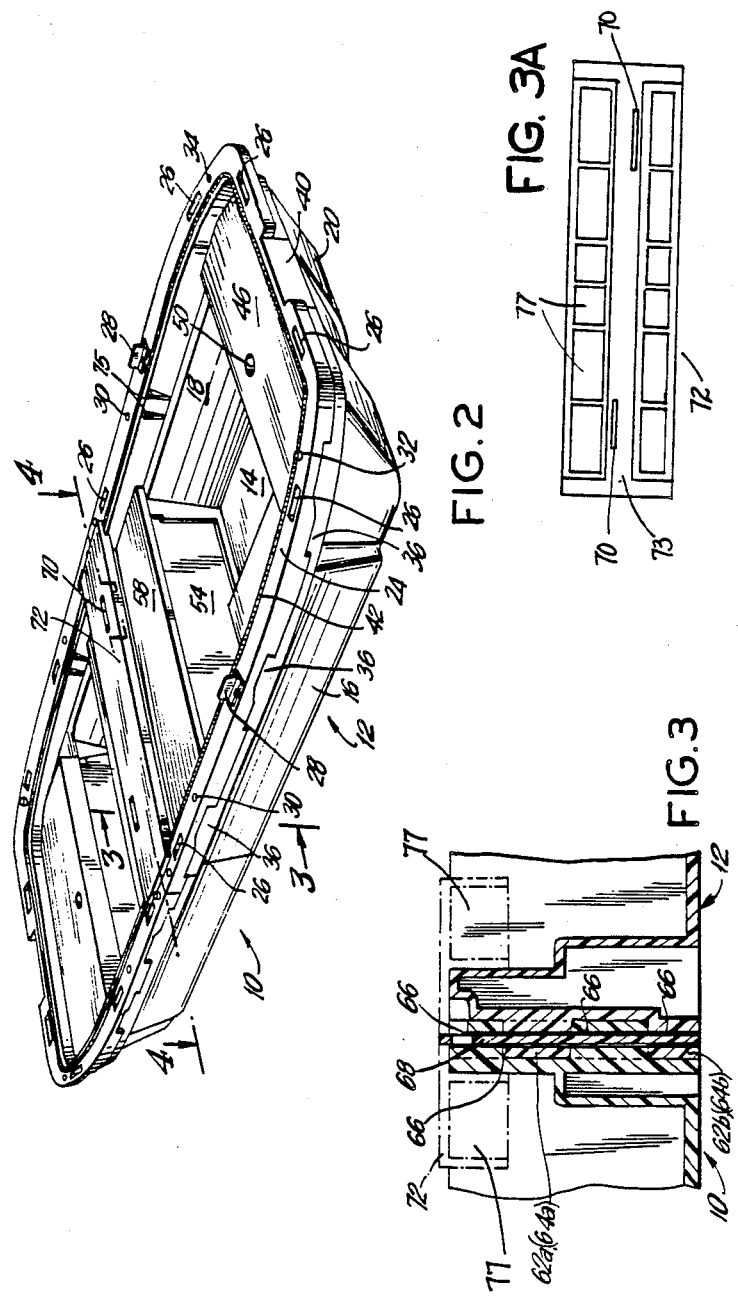

TWO-PIECE COMBINATION BOAT AND LUGGAGE CARRIER

CROSS REFERENCE TO RELATED APPLICATIONS

This is a continuation-in-part of co-pending U.S. patent application Ser. No. 788,684, filed Oct. 16, 1985, now abandoned, which is a continuation-in-part of U.S. patent application Ser. No. 660,717, filed Oct. 15, 1984, now abandoned. The entire disclosure of Ser. No. 788,684 is hereby incorporated herein by reference.

BACKGROUND OF THE INVENTION

The present invention is related to a boat structure, and, in particular, a boat having two substantially identical sections which can be connected together in a first configuration so as to function as a boat, and in a second configuration so as to function as a luggage or cargo carrier.

For the camper, hiker, fishermen, or the like, it is often necessary or desireable to transport a boat on the top of an automobile, and to have additional storage space for luggage and other cargo beyond that which is available within the automobile itself. One convenient solution to both of these problems is a combination boat and automobile luggage carrier. Such combinations have existed, as, for example, that disclosed in U.S. Pat. No. 3,684,139 to Johnson. However, the combination boat and luggage carriers that have been available have not been entirely satisfactory. For example, a major concern is to produce a structure which will be rigid, when used in the water, yet light enough to carry on a car top. Also, prior art combination boat and luggage carriers have suggested the use of at least two different sections from which the boat is constructed, leading to increased manufacturing costs.

OBJECTS AND SUMMARY OF THE INVENTION

It is therefore an object of the present invention to produce a combination boat and luggage carrier which is light-weight, readily constructed and disassembled, provides a sturdy and secure connection between boat halves, and which can be constructed of two substantially identical boat sections.

In accordance with the present invention, a two-section boat includes first and second substantially identical sections, each having a horizontal bottom surface, at least two generally vertical sidewalls connected to the bottom surface at the periphery thereof, and a generally vertical connecting wall. The connecting wall is preferably provided with a male connector which protrudes from the surface of the connecting wall in a direction generally normal to the plane of the connecting wall, and a complementary female connector which is recessed into the connecting wall in a direction generally normal to the plane of the connecting wall. The male and female connectors are symmetrically separated from the vertical center line of the connecting wall, whereby the male and female connectors cooperate with each other when the connecting walls of the first and second sections are placed in abutting relationship with one another. A pair of removable interlocking assembly blades are adapted to engage and thereby join each of the male and female connectors.

More specifically, the male connector preferably comprises upper and lower rectangular members, and the female connector comprises upper and lower rectangular recesses, the upper rectangular member and the upper rectangular recess being vertically spaced from the top of the connecting wall and the lower rectangular member and the lower rectangular recess being substantially aligned with the bottom of the connecting wall.

Preferably, at least one generally vertical slot is provided through the male connector, and at least one generally vertical slot is provided through the connecting wall vertically adjacent to the female connector, such that when the male and female connectors are placed in abutting relation, the slots create a vertical passageway therethrough from the upper edge to the bottom surface of the respective sections. An assembly blade is provided for insertion into the passageway and adapted to lock the connecting walls together.

Additionally, a center seat is provided for placement on top of the connecting walls when the connecting walls are joined. The center seat is adapted to engage and straddle the upper abutting edges of the connecting walls and thereby further secure the two sections. The center seat is also provided with slots which cooperate with the tops of the assembly blades when the center seat is positioned on top of the connecting walls. Preferably, the assembly blades are flush with the top of the center seat.

BRIEF DESCRIPTION OF THE DRAWINGS

These and other objects, aspects and embodiments of the invention will be described further with reference to the following drawing figures of which:

FIG. 2 is a perspective view of the two-section boat in assembled form;

FIG. 3 is a partial cross-sectional view taken through Section 3—3 of FIG. 2;

FIG. 3A is a plan view of the underside of the center seat.

DETAILED DESCRIPTION OF THE INVENTION

Figure 1:
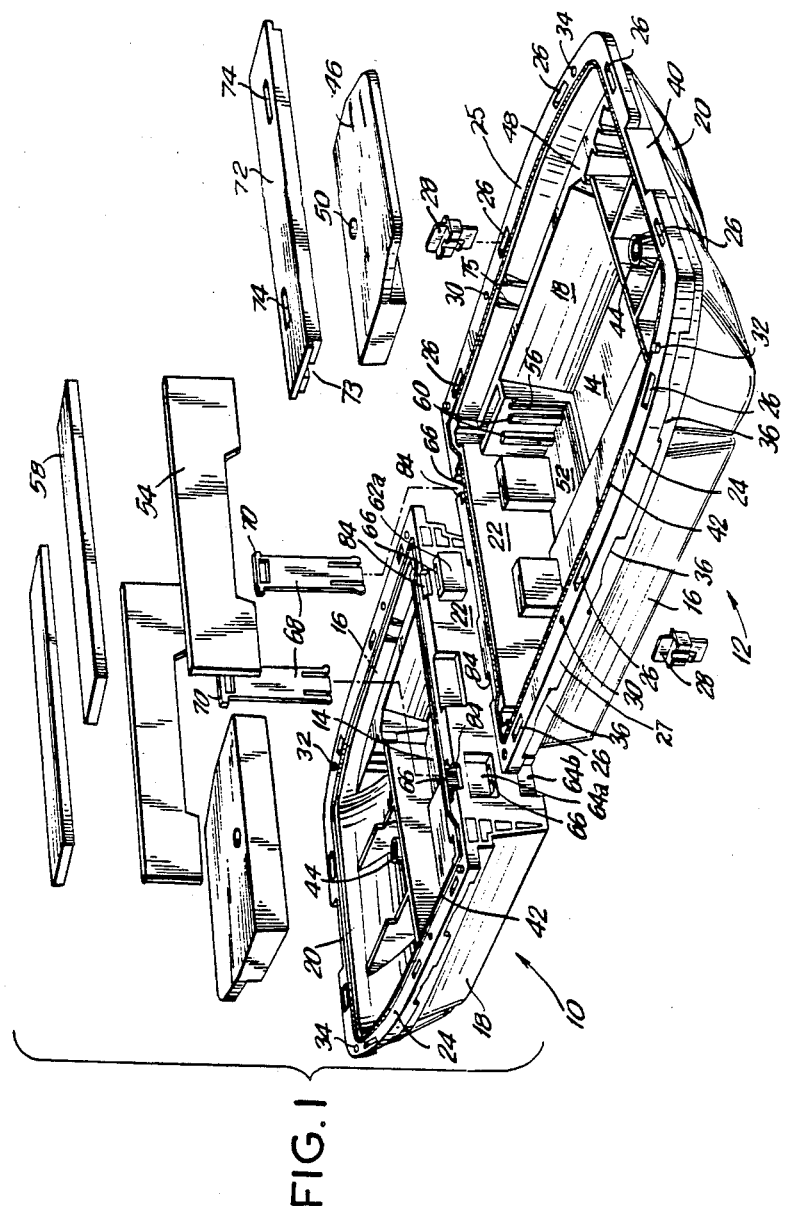
FIG. 1 is an exploded view of the two-section boat in accordance with the present invention.
Figure 4:
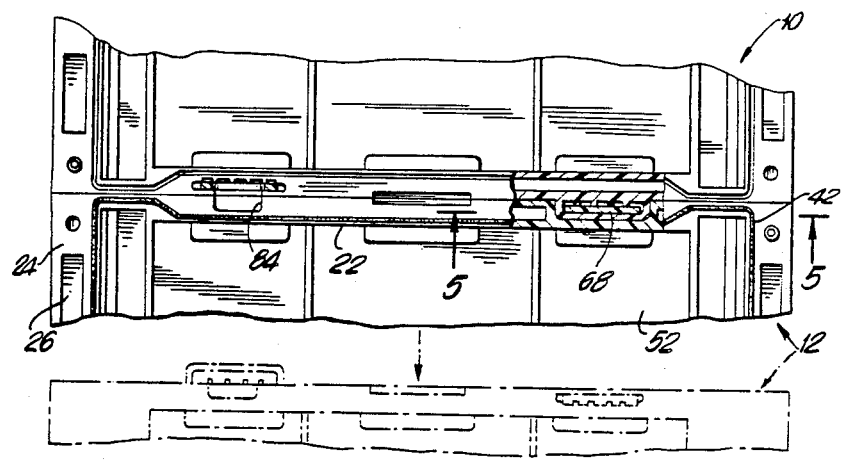
FIG. 4 is a partial cross-sectional view taken through Section 4—4 of FIG. 2.
Figure 6:
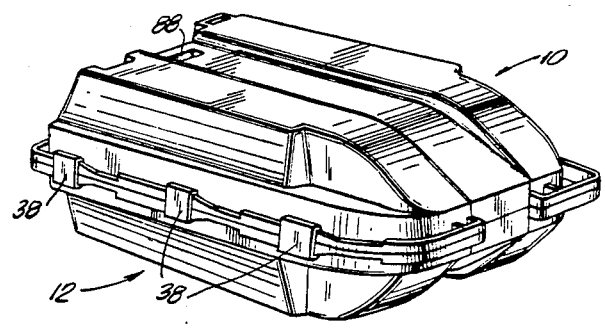
FIG. 6 is a perspective view of the two-section boat when configured as a luggage or cargo carrier.
Figure 9:
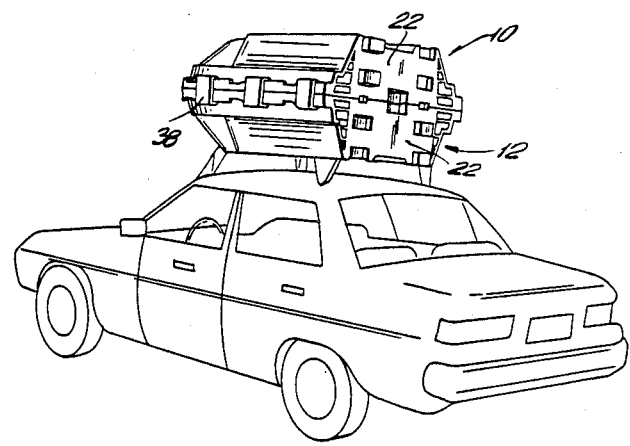
FIG. 9 is an illustration of the luggage or cargo carrier, in accordance with the present invention, mounted upon a car top.

With reference to FIGS. 1 and 2, the two-section boat, in accordance with the present invention, includes first and second substantially identical sections 10 and 12, connected as shown. As discussed more fully below, the first and second sections 10 and 12 may also be connected as shown in FIG. 6 to function as a luggage or cargo carrier which may be transported on top of a car, as shown in FIG. 9, for example.

Each section 10 and 12 includes a bottom portion 14, a pair of generally vertical sidewalls 16 and 18, a generally inclined end wall 20; and a generally vertical connecting wall 22. The walls 16, 18, 20 and 22 are connected to the bottom 14 of the boat at the periphery thereof, and are preferably integral therewith.

Figure 8:
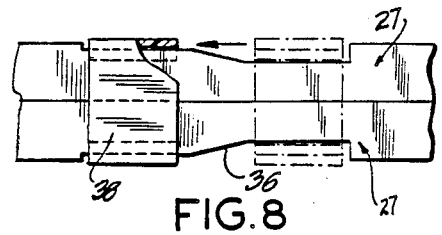
FIG. 8 is an illustration of the locking mechanism employed in the arrangement of FIG. 6.

The sections 10 and 12 are each provided with a ledge 24 in the nature of gunnels, connected to, and extending outwardly from, the upper edges of the sidewalls 16 and 18, and end wall 20. As shown in FIGS. 1 and 8, the ledge 24 consists of a horizontal surface 25 and a downwardly projecting flange section 27. The ledge 24 includes a plurality of slots, or hand-holes, 26 into which brackets 28 may be inserted. The brackets 28 may be used to mount or hang any item on the boat, for example, a canopy, duck-blind, fishing rod holder, sailing apparatus, etc. In this manner, no holes will ever have to be put into the boat to secure any items thereto.

Also disposed on the horizontal surface 25 of ledge 24 are a pair of holes 30 into which an oar lock bushing may be inserted, for use with an oar lock. The surface 25 is further provided with a protruding "key" 32, and a corresponding "keyhole" 34, so that when the two sections 10 and 12 of the boat are connected as shown in FIG. 6, the key 32 on section 12 will fit into the keyhole 34 of section 10, and the key 32 of section 10 will similarly fit into the keyhole 34 of section 12, to provide alignment of the sections.

Figure 7:
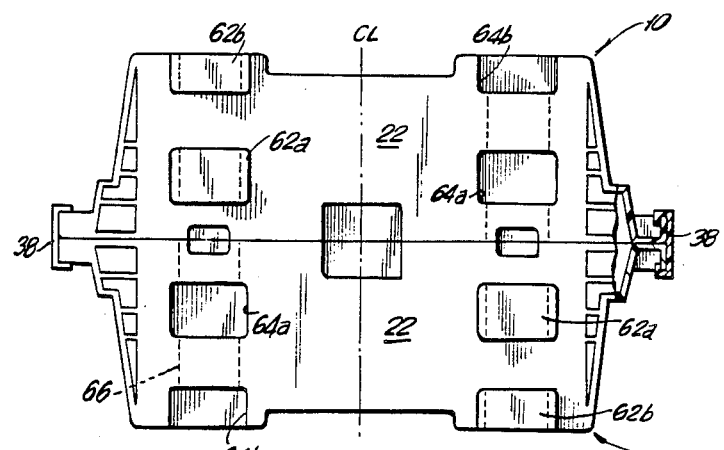
FIG. 7 is a planar view of the back portion of the luggage or cargo carrier of FIG. 6.

The flange section 27 of ledge 24 is contoured at three locations 36 along each of the sidewalls 16 and 18 to allow the application of clamps 38, FIGS. 6–8, which function to secure the superposed sections 10 and 12 tightly together to form the cargo carrier, in the manner illustrated in FIG. 8.

The ledge 24 terminates at a predefined location along the end wall 20, to provide a centrally located, substantially flat vertical area 40 upon which an outboard motor can be mounted.

Also located about the periphery of the top edges of the sidewalls 16 and 18, end wall 20 and connector wall 22, is a slot or groove 42 adapted to receive a resilient elastomeric gasket 43. The gasket can be fabricated from neoprene or other material which resists weathering. The gasket 43 is fixedly secured on one of the sections 10 or 12, such that upon closure of the boat, as shown in FIG. 6, the gasket, which projects from the section in which it is fixedly secured, will engage the slot of the other section, thus providing a water-tight seal around the entire periphery of the joined sections.

Formed on the interior of the boat is a mount 44 into which a sail mast, swivel chair, or the like, can be inserted. A front seat 46 is secured to the upper edge of a sidewall platform 48 such that it abuts sidewalls 16 and 18, and end wall 20. A hole 50 is provided in the front seat 46 to allow the mast or chair to be mounted within the mount 44. Preferably, the seat 46 is permanently secured to the boat using conventional fastening means, and the area underneath the seat filled with a buoyant floatation material such as marine grade structural polyurethane foam, or other comparable material.

A storage compartment, generally indicated at 52, is formed by placing a removable, vertical panel 54 within slots 56, and by placing a seat 58 on top of the panel 54 and sidewall platform 48, as best illustrated in FIGS. 1 and 2. Optional brackets 60 can be provided in the storage compartment, for the storage of clamps 38, when the boat is in use. As illustrated in FIGS. 3 and 3A, the seat 72 and the seats 58 can be designed to include, on the underside thereof, a plurality of compartments 77, whereby the seat can double as a tackle tray when inverted.

In accordance with the present invention, connection of the first and second boat sections 10 and 12 to each other is accomplished through the use of a connection system which provides a rigid and secure connection therebetween, while at the same time facilitating the easy construction and disassembly of the sections. Furthermore, by employing the connection system in accordance with the present invention, the two sections of the boat can be substantially identical, thus requiring the manufacture of only a single interchangeable section.

With specific reference to FIGS. 1, 3–5 and 7, a male connector, comprising upper and lower, generally rectangular members 62a and 62b, respectively, protrude outwardly from the connecting wall 22 in a direction generally normal, or perpendicular, to the plane of the connecting wall. The connecting device also includes a complementary female connector comprising upper and lower generally rectangular female recesses 64a and 64b, which are recessed into the connecting wall 22, in a direction generally normal to the plane of the connecting wall. The male and female connectors are symmetrically disposed about a vertical center line of the connecting wall, as shown in FIG. 7, whereby the male and female connectors cooperate with each other when the connecting walls of the first and second sections are abutted with one another.

Specifically, when constructed to form a boat, as shown in FIGS. 1 and 2, male members 62a and 62b of boat section 12 will fit into female recesses 64a and 64b, respectively, of boat section 10. Similarly, male members 62a and 62b of boat section 10 will fit into female recesses 64a and 64b of boat section 12. As shown, the male members 62a and the female recesses 64a are located on the connecting wall 22 so as to be separated, vertically, from the upper edge of the connecting wall 22, whereas male member 62b and female recess 64b are positioned on the connecting wall 22 substantially at the bottom thereof. This arrangement affords a "clean", or straight line of abutment along the top edges of the connector walls 22, when the boat sections 10 and 12 are connected to each other, while at the same time maintaining a rigid and secure connection therebetween.

Figure 5B:
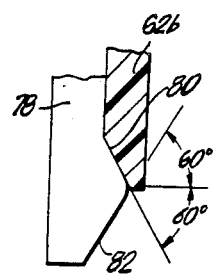
FIG. 5B is a detail of one of the prongs of the assembly blade illustrated in FIG. 5A.
Figure 5A:
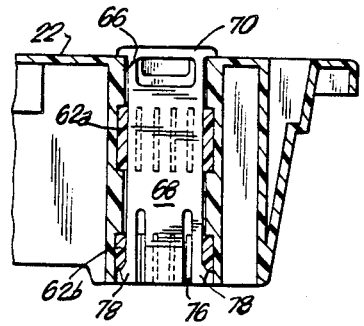
FIG. 5A is a partial cross-sectional view taken through Section 5—5 of FIG. 4.

With reference to FIGS. 1 and 3–5a, a plurality of slots 66 are provided through the male members 62a and 62b, and between female recesses 64a and 64b, which, when the connecting walls 22 on the first and second sections of the boat are abutted to one another, are in vertical alignment, as best shown in FIGS. 3 and 5. When so abutted, the boat sections 10 and 12 are securely connected to one another by inserting a assembly blade 68 through the vertical passageway defined by the slots 66. The assembly blades 68 substantially conform in their outer dimensions to the inner dimensions of the vertical passageway formed by the slots 66. The assembly blade is inserted into the passageway, to its full extent, until a handle portion 70, on the top of the blade, abuts the top edge of the connecting wall 22, as shown in FIG. 5A.

A center seat 72 (FIGS. 1–3) is placed over and straddles the connecting walls 22, as best shown in FIG. 3. The seat 72 is provided with a transverse slot 73 on its underside which is adapted to straddle the mated connecting walls 22 and further secure them in the joined configuration. The seat 72 is also provided with a pair of slots 74 adapted to receive the handles 70 of the assembly blades 68. When thus mounted, the assembly of the boat is complete. It will be seen that the top of the handle 70 does not extend substantially above the surface of the center seat 72 when so constructed, thereby providing an unobstructed surface.

If desired, the center seat 72, or an additional seat 72, can be moved and placed at various locations along the sidewalls 16 and 18 of either section of the boat for seating or use as a table, as desired. Brackets 75 may be placed at a desired position along the sidewalls 16 and 18 so as to keep the seat 72 from sliding when placed at that location.

Returning to FIG. 5A, the assembly blades 68 are provided with vertical slots 76 at the bottom thereof, to thereby define a pair of prongs 78 at the bottom of each assembly blade. The assembly blades are preferably formed of a high strength resilient material, such as, for example, high density polyethylene or polypropylene, or a copolymer blend. With reference to FIG. 5B, at the bottom of each prong 78, on the outward surface thereof, are a pair of protruding, inclined surfaces 80 and 82, each preferably inclined about 45° to 60° from the horizontal, as shown, which facilitate the insertion and withdrawal of the assembly blade 68 and thereby permit the rapid assembly, secure connection, and easy disassembly of the two sections. Specifically, as the assembly blade 68 is inserted into the vertical passageway, the inclined surface 82 will cause the prongs 78 to resiliently move inwardly in order to fit within the passageway 68, until it is fully inserted, as shown in FIG. 5A. At that location, the assembly blade will be securely held in place by virtue of the force required to move the assembly blade upwardly, due to the abutment of inclined surface 80 against the bottom of the male connector 62b. The connection between the two sections 10 and 12 is further stabilized by the placement of center seat 72 over the abutting connecting walls 22, so as to straddle the walls as illustrated in FIG. 3.

In order to disassemble the boat, the center seat 72 is removed, the assembly blades 68 are gripped by the handle 70 and pulled upwardly out of the vertical passageway, against the force of the resilient prongs 78. Cut out portions 84, along the top of the connecting walls 22, provide room in which to grip the assembly blades 68 for removal.

As shown in FIG. 9, when closed, the two sections form a water-proof carrier which can be placed on top of a car or camper, or in a separate trailer, and used as a luggage or cargo carrier. When so used, the panels, seats and assembly blades can be stored within the boat sections while still providing a substantial amount of room for carrying other items.

Figure 10:
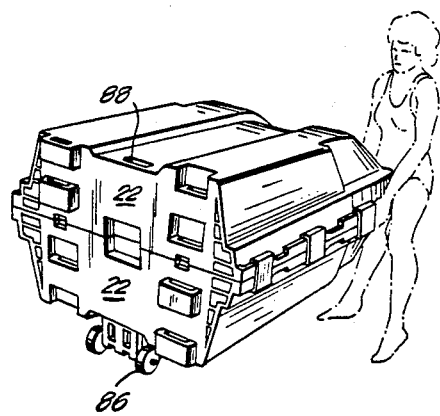
FIG. 10 is an illustration of the use of a wheel assembly for facilitating the transport of the two-section boat in accordance with the present invention.

In order to facilitate the easy transport of the sections, a slot 88, shown in FIGS. 6 and 10, is provided in the outer surface of the bottom portion 14. A wheel assembly 86 may be provided and inserted into a slot 88, as generally illustrated in FIG. 10.

Although shown in FIG. 2 as portions of a single boat, the first and second sections are both water-tight and may be used individually as two, independent boats, if desired. Further, by virtue of the gasket 43, the luggage or cargo carrier configuration is also water-tight and suitable for operations requiring an "air drop" of the carrier into a body of water, and assembly into the form of a boat in the water.

Preferably, the boat is injection molded out of structural foam, such as a blend of polypropylene or polyethylene, or other similar material. The assembly blade 68 can be fabricated from high density polyethylene or polypropylene, or a copolymer blend. However, other suitable materials and methods of fabrication will become apparent to those skilled in the art.

The dimensions of the boat can be selected to suit its particular application, within the constraints imposed by adequacy of size and portability. Typically, each section of the boat will be on the order of four to six feet in length, three to five feet in width and nine to eighteen inches in depth. It will be appreciated, however, that variations to these dimensions can be made as desired.

Preferably, both sections of the boat will weigh, together, on the order of 120 to 180 pounds. It is estimated that a boat having sections each having a length of 60 inches, width of 46 inches and depth of 14 inches will weigh a total of about 150 pounds.

Other changes and variations to the present invention will occur to those skilled in the art in view of the foregoing description. It is intended that such changes and variations be encompassed so long as the present invention is employed, as defined by the following claims.

I claim:

1. A two-section boat comprising,
first and second substantially identical sections each having a substantially horizontal bottom surface, at least two generally vertical side walls joined to said bottom surface at the periphery thereof, and a generally vertical connecting wall,
said connecting wall configured with a plurality of vertically aligned male connectors which protrude from the surface of said connecting wall in a direction generally normal to the plane of said connecting wall, and a plurality of vertically aligned complementary female connectors which are recessed into said connecting wall in a direction generally normal to the plane of said connecting wall, said male and female connectors symmetrically disposed from a vertical center line of the connecting wall, and adapted to mate with each other when the connecting walls of said first and second sections are placed in abutting relation to one another, and a removable planar connector adapted to join the male and female connectors.

2. The two-section boat of claim 1 wherein said plurality of male connectors comprise substantially flat rectangular members and said female connectors comprise corresponding substantially flat rectangular recesses.

3. The two-section boat of claim 2 wherein said plurality of rectangular members are of substantially equal width and said plurality of rectangular recesses are of a corresponding substantially equal width.

4. The two-section boat of claim 2 wherein said plurality of rectangular members protrude from said connecting wall approximately equal distances and said rectangular recesses are recessed into said connecting wall a corresponding substantially equal depth.

5. The two-section boat of claim 1 wherein said plurality of male connectors comprises upper and lower rectangular members, and said plurality of female connectors comprises upper and lower rectangular recesses, said upper rectangular member and said upper rectangular recess being vertically spaced from the top of said connecting wall, and said lower rectangular member and said lower rectangular recess being substantially aligned with the bottom of the connecting wall.

6. The two-section boat of claim 1 or claim 5, further comprising:
at least one generally vertical elongated slot through said male connector and at least one generally vertical slot through said connecting wall vertically adjacent to and aligned with said female recess, such that when said male and female connectors are positioned in abutting, mated relationship, said slots create a vertical passageway, and wherein said removable planar connector comprises an assembly blade adapted to be inserted into said vertical passageway and to lock said connecting walls together.

7. The two-section boat of claim 6 wherein said assembly blade comprises a generally planar, rectilinear structure having a handle, and a resilient prong on at least one side thereof to facilitate the insertion into, and removal from, said vertical passageway.

8. The assembly blade of claim 7 wherein said prong is configured with an angled protrusion at the bottom thereof adapted to retain said assembly blade in place when inserted into said passageway.

9. The two-section boat of claim 7 further comprising a center seat adapted to engage and secure the upper edges of said connecting walls, when said connecting walls are joined.

10. The two-section boat of claim 9 wherein said center seat is provided with slots adapted to receive said handles on said assembly blades when inserted, and wherein the tops of said handles are substantially flush with the top of said center set when said center set is in place.

11. The two-section structure of claim 1 wherein said removable connector does not extend substantially above the connecting walls.

12. The two-section boat of claim 1 further comprising a resilient elastomeric gasket attached to the upper surface of the periphery of the first section and adapted to mate with the upper surface of the periphery of the second section when said second section is placed on top of said first section, to prevent water from entering the structure when the structure is configured as a carrier.

13. A two-section boat comprising, first and second substantially identical sections each having a substantially horizontal bottom surface, at least two generally vertical side walls joined to said bottom surface at the periphery thereof, and a generally vertical connecting wall,
said connecting wall configured with a plurality of vertically aligned flat surfaced generally rectilinear male connectors which protrude from the surface of said connecting wall in a direction generally normal to the plane of said connecting wall, said connecting wall also having a plurality of vertically aligned flat surfaced generally rectilinear complementary female connectors which are recessed into said connecting wall in a direction generally normal to the plane of said connecting wall, whereby said male and female connectors mate with each other when the connecting walls of said first and second sections are placed in abutting relation to one another.
at least one generally vertical elongated slot through said male connectors and at least one generally vertical slot through said connecting wall vertically adjacent to said female recesses such that when said male and female connectors are in abutting, mated relation, said slots create a vertical passageway,
and a planar assembly blade having substantially parallel flat faces for insertion into said passageway and adapted to lock said connecting walls together.

14. The two-section boat of claim 1 or 13 further comprising a plurality of slots disposed along the upper edges of at least one of said vertical sidewalls, and a bracket releasably insertable into said slots to facilitate the connection of an implement to the boat.

15. The two-section boat as defined in claims 1 or 13, further comprising a recess in each side of the upper edge of at least one of said vertical sidewalls, for mounting an oar.

16. The two-section boat as defined in claims 1 or 13, further including a mount affixed to the inside bottom surface of at least one of said first and second sections adapted to receive a sail mast, a swivel chair, or the like.

17. A two-section boat as defined in any one of claims 1 or 12, wherein each of said first and second sections is substantially water-tight, whereby said first and second sections can be used independently of one another.

18. A two-section boat as defined in claims 1 or 12, further comprising a wheel assembly, and a slot on the underside of at least one of said first and second sections into which said wheel assembly can be inserted, to facilitate the transport of said first and second sections.

19. A combination two-section boat and portable cargo carrier comprising
first and second sections, each having a substantially horizontal bottom surface, at least two generally vertical sidewalls joined to said bottom surface at the periphery thereof, and a generally vertical connecting wall, said connecting wall on said first section configured with a plurality of vertically aligned male connectors which protrude from the surface of the connecting wall in a direction generally normal to the plane of said connecting wall, said connecting wall on said second section having a plurality of vertically aligned complementary female connectors which are recessed into said connecting wall in a direction generally normal to the plane of said connecting wall, whereby said male members and said female recesses are adapted to mate with each other when the connecting walls of said first and second sections are abutted with one another,
and wherein said generally vertical sidewalls terminate in outwardly extending, downwardly projecting flange surfaces contoured to receive a plurality of clamps to secure the superposed first and second sections.

20. The combination structure of claim 19 wherein the clamps are generally C-shaped and slidingly engage the flanged surfaces of the superposed sections.

* * * * *